Jan. 7, 1936.  C. R. DOWNS  2,027,094
METHOD AND APPARATUS FOR DEHUMIDIFYING AIR
Filed April 6, 1934
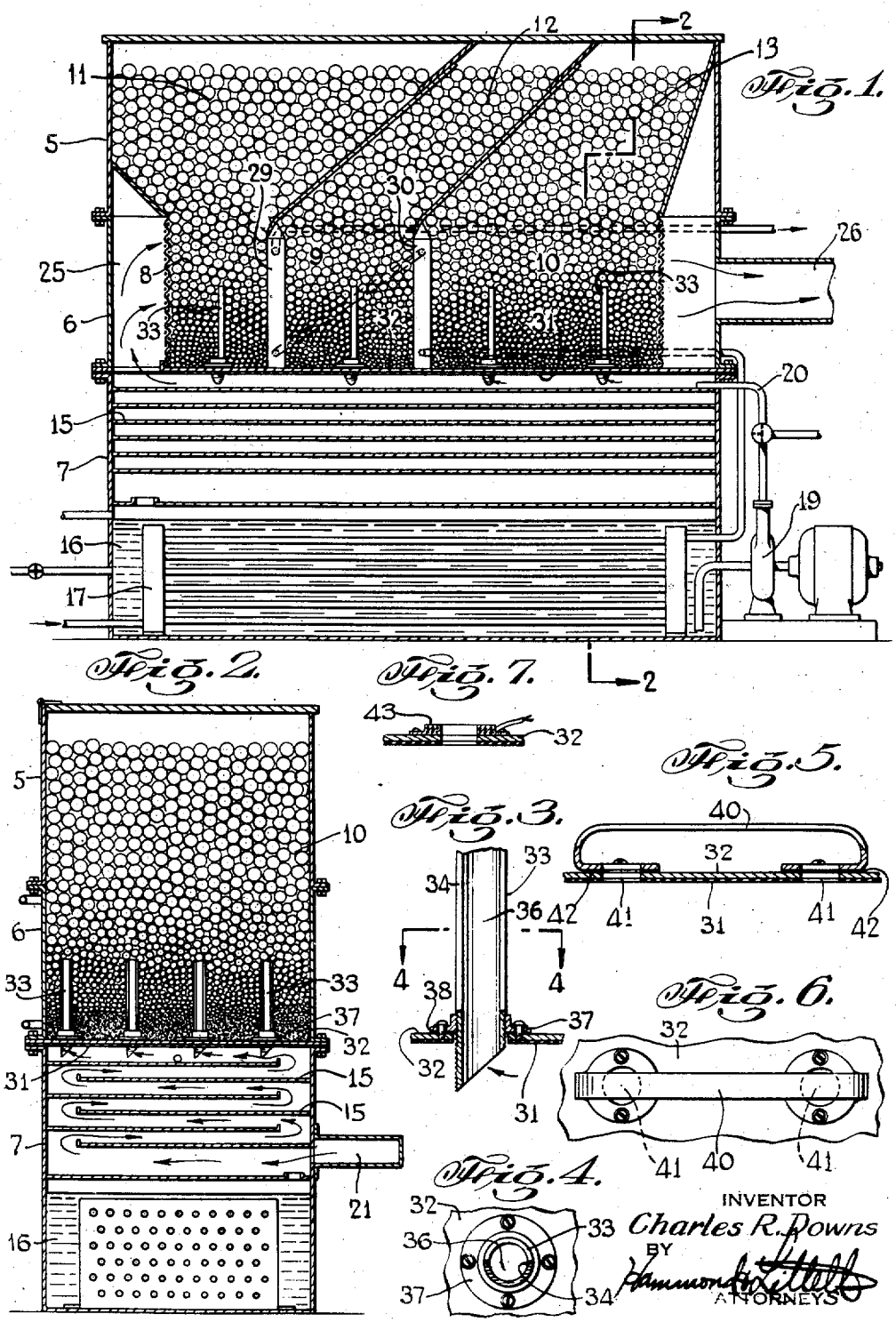
INVENTOR
Charles R. Downs
BY
ATTORNEYS Patented Jan. 7, 1936

2,027,094

UNITED STATES PATENT OFFICE 2,027,094

METHOD AND APPARATUS FOR DEHUMIDIFYING AIR

Charles R. Downs, Old Greenwich, Conn., assignor to Weiss and Downs, Inc., New York, N. Y., a corporation of New York Application April 6, 1934, Serial No. 719,248

15 Claims.  (Cl. 183—4)

The present invention relates to improvements in the art of controlling the humidity of air or gases to suit the comfort of individuals or to suit the requirements of manufacturing processes and the like.

One object of the invention is to provide an improved method and apparatus for dehumidifying air or other gas to maintain a predetermined moisture content.

Another object is to make improved provision for temperature control.

The invention aims especially to improve the drainage of the solution of deliquescent material formed when air or other gas is dehumidified by contact with solid deliquescent material.

Another object of the invention is to provide an improved method and apparatus for dehumidifying air which makes a more efficient use of the dehumidifying material such as calcium chloride for example by causing the air to flow over pools of liquid calcium chloride and through solid beds of calcium chloride and with the calcium chloride liquefied in the beds draining into the pools over which the air flows.

The present invention constitutes an improvement over that defined in my prior application Serial Number 672,415, filed May 22, 1933 of which this application is a continuation in part.

The method of dehumidification with which the invention is more particularly concerned involves passing air through one or a series of drying zones preferably including a pre-drying zone wherein air is brought into contact with a deliquescent material in liquid phase, and thereafter is brought into contact with a drying zone which may consist of a plurality of compartments containing deliquescent material in solid phase. When operating under usual dehumidifying conditions the air must be cooled to counteract the heating of the air and of the deliquescent material due to the effect of the latent heat of the moisture removed and of the heat resulting from the absorption of the moisture by the deliquescent material. The cooling may conveniently be carried out by cooling the deliquescent liquid before the air contacts therewith and by cooling the air by passing the air through suitably designed cooling units between the compartments of solid deliquescent material.

In the arrangement to be more particularly described for the purpose of illustrating the invention, the deliquescent solid, which may be calcium chloride, is supported in a plurality of separate beds above a series of trays arranged in cascade relation into which trays the deliquescent solution, formed as the solid calcium chloride absorbs moisture, drips from the beds. The air to be dried is passed over the surfaces of pools of deliquescent liquid maintained in the trays and thence through the beds of solid calcium chloride. The solution is drained separately from the several beds of solid deliquescent material onto the uppermost tray of the series.

There are certain advantages in maintaining a circulation of the liquid in the trays. Such circulation can conveniently be maintained by pumping the liquid from beneath the trays to the top tray. There is the further advantage in so circulating the liquid that it can be caused to fall in a continuous sheet or in a shower from each tray to the next beneath, thus insuring thorough contact of the air with the liquid. The velocity of the circulation of the liquid and the velocity of the air may be so adjusted that the liquid falls in a substantially continuous sheet over the edge of each tray or in separate streams, and the air in passing through each sheet of liquid is thoroughly contacted to be cleaned and dehumidified, the adjustment may be such that liquid is entrained in the air and thrown against the sides of the casing and even against the lower surfaces of the trays.

When air, still containing moisture above the desired amount passes from the pools into the beds of solid calcium chloride, further moisture is removed therein with the liberation of heat, and the partially liquefied calcium chloride drips from each bed separately onto the uppermost tray.

Under certain conditions of operation there is a tendency for the outlets through which the concentrated solution from the solid calcium chloride beds drips to become obstructed by the congealing of the concentrated solution. It is to be borne in mind that the solid calcium chloride in the upper compartments is heated by the absorption of the moisture as well as by the release of the latent heat of the moisture changing from vapor to liquid, and that the initial liquefaction is a factor of the moisture absorbed from the air and the temperature of the calcium chloride, so that a slight drop in temperature will cause this thick viscous liquid originally formed to congeal instead of flowing away. It may happen, therefore, that the lower portion of the operative charge of solid calcium chloride where the airflow is less free is enough cooler than the upper and central part, so that as the liquid solution formed in the central portion of the bed passes downward a part or all of it congeals in the lower portion of the charge and around the outlet. This congealing is more likely to occur when the operation of the system is interrupted. This possibility of obstruction during use is increased by the air flowing above the trays and beneath the bottoms of the solid calcium chloride compartments thereby tending to cool the bottom of the solid calcium chloride compartments. According to the present invention provision is made for preventing cooling of this concentrated solution around the outlet.

The avoidance of cooling can be accomplished by different expedients employed severally or together. The outlets may be insulated in a manner to prevent the influence, adjacent to such outlets, of the cooling effect of the air passing through the system, or, heat may be applied adjacent to the outlets in order to compensate for the tendency toward a cooler condition of the lower portion of the charge. While heat may be applied by electrical devices or otherwise, it is usually sufficient and it is simpler to provide means for transmitting the heat of the upper or central portion of the charge to the lower portion thereof and especially to the position around the outlets. To this end heat transmitting elements may be arranged within the charge and extending from the more active warmer portion of the charge to the outlets.

The various features of the invention will be better understood from a consideration of a particular illustrative embodiment, for the purpose of which description reference should be had to the accompanying drawing forming a part hereof and in which—

Figure 1 is a vertical longitudinal sectional view of an air conditioning apparatus embodying the invention, Figure 2 is a transverse vertical sectional view taken on the line 2—2 of Figure 1, Figure 3 is a detail sectional view showing one form of heat transmitting element, Figure 4 is a horizontal sectional view of the same taken on the line 4—4 of Figure 3, Figures 5 and 6 are respectively sectional and plan view of another form of heat transmitting element which is adapted also to form a supporting element which tends to prevent clogging of the solid calcium chloride around the outlets, and, Figure 7 is a further modification showing an electrical resistance heating element.

The apparatus shown for the purposes of illustration comprises a housing formed for convenience in three sections 5, 6, 7. The central section 6 is fabricated to provide a series of compartments 8, 9, 10 for receiving solid calcium chloride, the uppermost section 5 being formed to provide hoppers 11, 12, 13 for feeding reserve charges of calcium chloride to the respective compartments and the lowermost section carrying a series of trays 15 arranged in cascade and which receive the deliquescent solution formed in the several compartments and dripping therefrom to the uppermost tray. At the bottom of this section a reservoir 16 is provided with a cooling unit 17 therein for cooling the calcium chloride solution which collects in the reservoir after passing through the trays. A pump 19 is provided to circulate the calcium chloride solution by pumping it from the reservoir through the conduit 20 to one of the uppermost trays, preferably the top tray, as in the illustrated structure.

Air is circulated through the apparatus from the inlet 21 successively over the pools of calcium chloride on the trays 15, as best shown in Figure 2, either from side to side as specifically illustrated or from end to end of the trays 15, and then upward into the chamber 25 and horizontally through the compartments 8, 9, 10 filled with solid calcium chloride or the like to the outlet conduit 26.

Under usual working conditions the air is preferably cooled to compensate for the heating effect of the calcium chloride in the compartments 8, 9, 10. For this purpose heat exchange units 29 and 30 are shown as positioned between the compartments to thereby cool the air and the adjacent beds of solid calcium chloride.

In the heat exchange or cooling units the water or other cooling fluid may pass first to the cooling unit 17 and then to the units 29 and 30, this arrangement usually giving a satisfactory order of relative temperatures and permitting the air to be discharged at approximately the same temperature at which it is taken into the apparatus.

To prevent cooling and congealing of the concentrated solution of calcium chloride formed in the solid beds means is provided for applying a small amount of heat around the outlets through which the concentrated calcium chloride solution drips from the beds to the trays 15. As a convenient means for this purpose, there are shown heat conducting members 33, which extend up into the body of the solid calcium chloride in each instance and down to the outlet. In the particular embodiment of structure shown in Figures 3 and 4, the heat conducting elements are formed of tubular material such as brass, copper or other metal of high heat conductivity and constitute outlets for conducting the concentrated solution from the beds. As shown the elements 33 are formed from tubes cut away at one side, the vertical edges 34 forming an open trough 36, into which the solution may readily flow at any position along the length of the tube. The lower larger cylindrical portions of these members 33 are threaded and fitted into threaded flanges 37 which, in turn are secured to the bottom plate 32, but carefully insulated therefrom by heat insulating material 38 interposed between the flange and the plate. The ends of members 33 are spaced from the plate 32 to prevent the lower ends of the members 33 from being cooled by conduction from the plate 32. If desired a sheet of insulating material 31 may be provided along the bottom of plate 32 to prevent this plate from being cooled by the air flowing therebeneath.

In operation the heat conducting elements 33 will be maintained substantially at the temperature of the solid calcium chloride, or at the temperature of the air passing through the calcium chloride. This heat will be transmitted down to the outlet which in the particular arrangement shown is through the tubular heat conducting member itself. The lower end of the heat conducting tubular members 33 is shown as cut at an angle with the concave side facing toward the current of air so that some air is deflected up through the tube. The air below the plate 32 is more moist than that in the compartments above the plate and its higher moisture content assists in keeping the drainage hole open by reducing the congelation point of the calcium chloride solution draining therethrough. The proportion of air so passed is too small to adversely affect the overall drying efficiency of the apparatus. In any event irrespective of the shape of the bottom of the delivery tube, the higher pressure of the air below the plate will cause some air to flow up through the drainage holes and thereby tend to keep them open.

In Figures 5 and 6 an alternative form of heat conducting member is illustrated. This bridge member 40 is shown as formed to extend horizontally through the charge of calcium chloride and downward to and around the outlets 41 through which the calcium chloride solution drips. Insulation 42 prevents cooling of the bridge member 40 from the bottom plate 32. In this form of device the horizontally extending portion tends to support a portion of the calcium chloride thereby to prevent it from packing around the outlets. It will be noted that the heat conducting member 40 is so shaped that it extends over and therefore supports the calcium chloride above the outlets.

The metal used for the heat conducting members should obviously be one having sufficient conductivity for the purpose. Aluminum, copper, or the like may be used, and is preferable because of the higher conductivity thereof but ordinarily iron or steel is sufficiently effective.

As an alternative or additional heating means electrical resistance heating units 43 may be arranged at the outlets as illustrated in Figure 7 and suitably insulated to prevent short circuiting.

While I have described a particular embodiment of my invention in an illustrative way it will be understood that other embodiments may be used or various modifications and changes made in the present embodiment without departing from the spirit of my invention or the scope of the appended claims.

I claim:

1. In an apparatus for conditioning air by the use of calcium chloride, a plurality of trays containing calcium chloride solution, and a plurality of beds of solid calcium chloride, means to cause the air to pass over said trays and through said beds to dehumidify the air, means to drain the material liquefied in said beds into said trays and means to maintain the liquefied material in said beds adjacent said drainage means above its point of congelation until mixed with the solution in said trays.

2. In an apparatus for conditioning air by the use of calcium chloride, a plurality of trays containing calcium chloride solution, and a plurality of beds of solid calcium chloride, means to cause the air to pass over said trays and through said beds to dehumidify the air, means to cool the air in its passage through the apparatus, means to drain the material liquefied in said beds into said trays and means to maintain liquefied material in said beds above its point of congelation until mixed with the solution in said trays.

3. In an apparatus for conditioning air by the use of calcium chloride, a plurality of trays containing calcium chloride solution, and a plurality of separated beds of solid calcium chloride, means to cool the air between the beds of calcium chloride, means to cause the air to pass over said trays and subsequently through said beds to dehumidify the air, means to separately drain the material liquefied in said beds into said trays and heat conducting means to maintain the liquefied material in said beds adjacent said drainage means above its point of congelation until mixed with the solution in said trays.

4. In an apparatus for conditioning air by the use of calcium chloride, a plurality of trays containing calcium chloride solution, and a plurality of beds of solid calcium chloride, means to cause the air to pass over said trays and through said beds to dehumidify the air, means to cool the air in its passage through the apparatus, openings to drain the material liquefied in said beds into said trays and means to maintain the drainage openings unobstructed, comprising means to conduct heat to said drainage openings and means to cause air to flow therethrough.

5. In apparatus for dehumidifying air or gas, a compartment for a charge of solid deliquescent material having an air inlet and an air exit for the passage of air in contact with the deliquescent material therein, and having an outlet for the discharge of the solution of deliquescent material draining from said solid material and means surrounding said outlets and extending inwardly of the compartment and into the charge for conducting latent heat of condensation of moisture developed in the charge to said outlet for inhibiting the cooling of the solution to prevent congealing thereof before discharge from the solution outlet.

6. In apparatus for dehumidifying air or gas, a compartment for a charge of solid deliquescent material having an air inlet and an air exit for the passage of air in contact with the deliquescent material therein, and having an outlet for the discharge of the solution of deliquescent material draining from said solid material and means for applying heat to the solution at the outlet to prevent congealing thereabout.

7. In apparatus for dehumidifying air, a compartment for a charge of solid deliquescent material having an outlet for liquid solution formed from the deliquescent material, means for passing air through the compartment in contact with said solid material whereby moisture is withdrawn from the air by the deliquescent material and heat released and whereby solution of said deliquescent material is formed, and means for conducting said released heat to the outlet to prevent congealing of the solution thereabout.

8. In apparatus for dehumidifying air, a compartment for a charge of solid deliquescent material having an outlet for liquid solution formed from the deliquescent material, means for passing air through the compartment in contact with said material whereby moisture is withdrawn from the air by the deliquescent material and heat released and whereby solution of said deliquescent material is formed, and a heat conducting element within the compartment contacting with the deliquescent material within the zone of the flow of air in contact therewith and extending to the outlet to conduct heat thereto.

9. In apparatus for dehumidifying air, a compartment for a charge of solid deliquescent material having an outlet for liquid solution formed from the deliquescent material, means for passing air through the compartment in contact with said material whereby moisture is withdrawn from the air by the deliquescent material and heat released and whereby solution of said deliquescent material is formed, and a heat conducting element within the compartment contacting with the deliquescent material within the zone of the flow of air in contact therewith and extending to the outlet to conduct heat thereto, said heat conducting element being insulated from the bottom member of the compartment.

10. In apparatus for dehumidifying air, a compartment for a charge of solid deliquescent material having an outlet for liquid solution formed from the deliquescent material, means for passing air through the compartment in contact with said material whereby moisture is withdrawn from the air by the deliquescent material and heat released and whereby solution of said deliquescent material is formed and heat conducting and supporting element extending from adjacent the outlet upward into the compartment and relatively horizontally to provide partial support for the deliquescent material to reduce packing thereof.

11. In apparatus for dehumidifying air, a compartment for solid deliquescent material having a bottom member provided with an outlet for liquid solution, means for passing air through the compartment and a heat conducting member for the temperature at said outlet above the solidifying temperature for said liquid solution.

12. The method of conditioning air by the use of calcium chloride, which comprises passing the air in contact with a solution of calcium chloride and through beds of solid calcium chloride, draining the material liquefied in said beds of solid calcium chloride separately through openings from each bed into the solution of calcium chloride, and causing a portion of the air passing over said solution of calcium chloride to flow through the openings through which the liquefied material flows.

13. The method of conditioning air by the use of calcium chloride, which comprises passing the air over a solution of calcium chloride and through a plurality of beds of solid calcium chloride, cooling of the air between the beds of solid calcium chloride, and draining the liquefied calcium chloride from each solid bed separately into the calcium chloride solution while maintaining the liquefied material in the drainage area above its point of congelation until it is mixed with the calcium chloride solution.

14. The method of dehumidifying air which comprises passing the air through a drying zone in contact with a solution of calcium chloride and thereafter through the body of a bed of solid calcium chloride constituting a second drying zone, draining the calcium chloride solution formed by deliquescence from the solid calcium chloride into the liquid zone through openings in the bottom of the second drying zone and applying heat at said openings of said second drying zone to maintain the draining solution above the congealing temperature.

15. The method of dehumidifying air which comprises passing the air through a drying zone in contact with a solution of calcium chloride and thereafter through a drying zone in contact with solid calcium chloride, thereby releasing heat by deliquescence of the calcium chloride, draining the calcium chloride solution formed by deliquescence from the solid calcium chloride into the liquid zone and transferring released heat to the area of the outlet through which the solution passes to maintain the same above the congealing point of the solution.

CHARLES R. DOWNS.

CERTIFICATE OF CORRECTION.

Patent No. 2,027,094.   January 7, 1936.

CHARLES R. DOWNS.

It is hereby certified that error appears in the printed specification of the above numbered patent requiring correction as follows: Page 4, first column, line 15, claim 11, after "for" insert maintaining; and that the said Letters Patent should be read with this correction therein that the same may conform to the record of the case in the Patent Office.

Signed and sealed this 11th day of February, A. D. 1936.

Leslie Frazer (Seal)   Acting Commissioner of Patents.

air through the compartment in contact with said material whereby moisture is withdrawn from the air by the deliquescent material and heat released and whereby solution of said deliquescent material is formed and heat conducting and supporting element extending from adjacent the outlet upward into the compartment and relatively horizontally to provide partial support for the deliquescent material to reduce packing thereof.

11. In apparatus for dehumidifying air, a compartment for solid deliquescent material having a bottom member provided with an outlet for liquid solution, means for passing air through the compartment and a heat conducting member for the temperature at said outlet above the solidifying temperature for said liquid solution.

12. The method of conditioning air by the use of calcium chloride, which comprises passing the air in contact with a solution of calcium chloride and through beds of solid calcium chloride, draining the material liquefied in said beds of solid calcium chloride separately through openings from each bed into the solution of calcium chloride, and causing a portion of the air passing over said solution of calcium chloride to flow through the openings through which the liquefied material flows.

13. The method of conditioning air by the use of calcium chloride, which comprises passing the air over a solution of calcium chloride and through a plurality of beds of solid calcium chloride, cooling of the air between the beds of solid calcium chloride, and draining the liquefied calcium chloride from each solid bed separately into the calcium chloride solution while maintaining the liquefied material in the drainage area above its point of congelation until it is mixed with the calcium chloride solution.

14. The method of dehumidifying air which comprises passing the air through a drying zone in contact with a solution of calcium chloride and thereafter through the body of a bed of solid calcium chloride constituting a second drying zone, draining the calcium chloride solution formed by deliquescence from the solid calcium chloride into the liquid zone through openings in the bottom of the second drying zone and applying heat at said openings of said second drying zone to maintain the draining solution above the congealing temperature.

15. The method of dehumidifying air which comprises passing the air through a drying zone in contact with a solution of calcium chloride and thereafter through a drying zone in contact with solid calcium chloride, thereby releasing heat by deliquescence of the calcium chloride, draining the calcium chloride solution formed by deliquescence from the solid calcium chloride into the liquid zone and transferring released heat to the area of the outlet through which the solution passes to maintain the same above the congealing point of the solution.

CHARLES R. DOWNS.

---

CERTIFICATE OF CORRECTION.

Patent No. 2,027,094.          January 7, 1936.

CHARLES R. DOWNS.

It is hereby certified that error appears in the printed specification of the above numbered patent requiring correction as follows: Page 4, first column, line 15, claim 11, after "for" insert maintaining; and that the said Letters Patent should be read with this correction therein that the same may conform to the record of the case in the Patent Office.

Signed and sealed this 11th day of February, A. D. 1936.

Leslie Frazer (Seal)          Acting Commissioner of Patents.